US012583689B2

(12) United States Patent
Schombert

(10) Patent No.: US 12,583,689 B2
(45) Date of Patent: Mar. 24, 2026

(54) FEEDER BOWL AND PREPARATION SYSTEM FOR PACKAGING STICK-LIKE OBJECTS

(71) Applicant: Greg Schombert, Knightstown, IN (US)

(72) Inventor: Greg Schombert, Knightstown, IN (US)

( * ) Notice: Subject to any disclaimer, the term of this patent is extended or adjusted under 35 U.S.C. 154(b) by 754 days.

(21) Appl. No.: 17/866,502

(22) Filed: Jul. 16, 2022

(65) Prior Publication Data

US 2023/0021384 A1     Jan. 26, 2023

Related U.S. Application Data

(60) Provisional application No. 63/223,117, filed on Jul. 19, 2021.

(51) Int. Cl.
| | |
|---|---|
| *B65G 47/14* | (2006.01) |
| *B65B 19/34* | (2006.01) |
| *B65B 35/46* | (2006.01) |
| *B65B 35/56* | (2006.01) |

(52) U.S. Cl.
CPC .......... *B65G 47/1464* (2013.01); *B65B 19/34* (2013.01); *B65B 35/46* (2013.01); *B65B 35/56* (2013.01); *B65G 2201/0202* (2013.01); *B65G 2207/26* (2013.01)

(58) Field of Classification Search
CPC ......... B65B 19/34; B65B 35/44; B65B 35/46; B65B 35/56; B65G 47/082; B65G 47/1464; B65G 47/1492; B65G 47/30; B65G 47/53; B65G 2201/0202; B65G 2201/0217; B65G 2207/26
See application file for complete search history.

(56) References Cited

U.S. PATENT DOCUMENTS

| | | | | |
|---|---|---|---|---|
| 4,960,025 | A | 10/1990 | Fitch | |
| 6,019,213 | A * | 2/2000 | Schubert | B65G 47/5113 |
| | | | | 198/419.3 |
| 6,170,634 | B1 * | 1/2001 | Jaquet | B65G 65/00 |
| | | | | 198/465.1 |
| 8,684,165 | B2 * | 4/2014 | Follows | B65G 47/53 |
| | | | | 198/570 |
| 9,604,790 | B2 * | 3/2017 | Jacobsen | B65G 47/1457 |
| 9,926,139 | B2 * | 3/2018 | Milo | B65G 11/023 |
| 2019/0322463 | A1 * | 10/2019 | Schombert | B65G 47/1464 |

FOREIGN PATENT DOCUMENTS

| | | |
|---|---|---|
| EP | 1985183 | 4/2007 |
| EP | 2305044 | 10/2009 |

* cited by examiner

*Primary Examiner* — Gene O Crawford
*Assistant Examiner* — Keith R Campbell
(74) *Attorney, Agent, or Firm* — Ritchison Law Offices, PC; John D Ritchison

(57) ABSTRACT

A feeder bowl and preparation system for packaging stick-like objects including a feeder bowl, vee shaped spacing conveyor, and a collator mechanism which permits a robotic pick-up station sufficient time to pick and place the stick-like object. The system simplifies programming the transfer of the objects by presenting a desired amount of product for a specific picker and allowing time to pick and place the object, the system eliminates a feed rate by a robotic process in the system, the system allows for essentially higher feed rate overall due to an oriented pick-up area presentation, and the system provides a sanitary design compatible with a transfer of food products in a food industry.

13 Claims, 7 Drawing Sheets

30

31

91 – beneath/not seen

DETAIL A

92

91

91

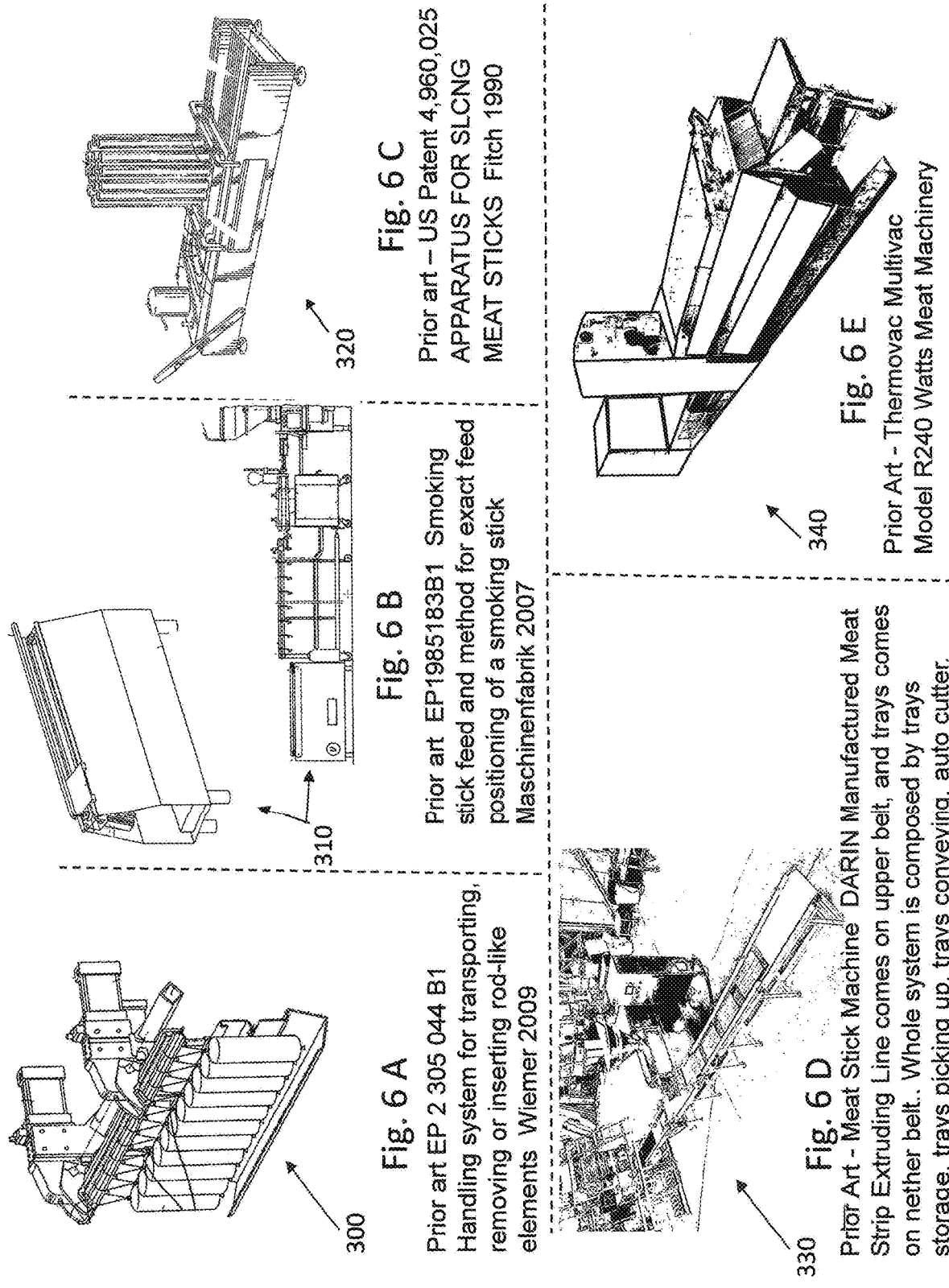

Fig. 6 A
300
Prior art EP 2 305 044 B1
Handling system for transporting, removing or inserting rod-like elements Wiemer 2009

Fig. 6 B
310
Prior art EP1985183B1 Smoking stick feed and method for exact feed positioning of a smoking stick Maschinenfabrik 2007

Fig. 6 C
320
Prior art – US Patent 4,960,025 APPARATUS FOR SLCNG MEAT STICKS Fitch 1990

Fig. 6 D
330
Prior Art - Meat Stick Machine DARIN Manufactured Meat Strip Extruding Line comes on upper belt, and trays comes on nether belt. Whole system is composed by trays storage, trays picking up, trays conveying, auto cutter.

Fig. 6 E
340
Prior Art - Thermovac Multivac Model R240 Watts Meat Machinery

FEEDER BOWL AND PREPARATION SYSTEM FOR PACKAGING STICK-LIKE OBJECTS

CROSS-REFERENCE TO RELATED APPLICATIONS

This application claims the benefit of United States Provisional Patent Application with Ser. No. 63/223,117 filed Jul. 19, 2021, by Greg Schombert. The application is entitled "A Feeder Bowl and Preparation System for Packaging Stick-like Objects."

FIELD OF INVENTION

This invention relates to a Feeder Bowl and Preparation System for Packaging Stick-like Objects. Particularly it relates to a feeder bowl, "vee" shaped spacing conveyor, and collator system to permit a station such as a robotic pick station sufficient time to pick and place a stick-like object/ product. The present disclosure relates generally to the preparation, orientation and handling stick-like objects by a system that automates the process. The present invention relates to a clean product aligning, separating and staging device made of food grade and cleanable grade materials that are easily disassembled and able to be washed in hot water and steam. It relates to a system that significantly reduces time, labor, and waste while increasing productivity, quality, and machine uptime.

FEDERALLY SPONSORED RESEARCH

None.

SEQUENCE LISTING OR PROGRAM

None.

BACKGROUND

Field of Invention and Prior Art

As far as known and revealed in searches, there are no feeder bowl and preparation system for packaging stick-like objects. It is believed that this system is unique in its design and technologies.

BACKGROUND

This background as to feeder systems for stick like and other objects are that they have been labor intensive and difficult to feed to automatic pick off or robotic unload systems and pack out/packaging machines. After the sticks are oriented, they need some manner to space the apart from each other and then to group them together. In grouping them, the spacing and timing is also difficult. Some spacing mechanism would be helpful to control the stick-like objects in groups. The industry tended to build a unique machine for each object and then place labor in the transfers to control the feed rates. Therefore, machines were interspersed with labor and fast, yet controlled transfers of the stick-like objects were difficult. The added machines cost additional capital, required spare parts, and often were built at different times with different designs and/or manufactures of the tooling and equipment. That forced more spare parts, added training for the tool and maintenance people and generally hampered repeatability and good training of the workforce.

In some other industries, especially food and pharmaceutical, various objects or products are placed into containers that have health, sterile, cleanability, and other stringent handling and preparation requirements. Therefore, machines should be cleanable, made of durable materials and easy to assemble and dis-assemble for tool and product change over as well as the hygienic/cleanability needs. Centrifugal precision feeders can be developed to aid in this process, but they must be manufactured from a high grade and hygienic grade materials.

PROBLEM SOLVED

The improvement and problem solved is therefore is a system with a compact footprint and floor space requirements that functions to uncouple the product load station from the robotic pick station which results in:

a) Simplifying the robotic picker programming by presenting a desire amount of product for a specific picker and allowing it sufficient time to pick and place product.

b) Eliminating the feed rates being dictated by the robotic picker.

c) Allowing for higher rates overall due to easy pick-up area presentation and by allowing the feeder to run at optimal rates.

d) Eliminating sensory overload on robotic picker. And— e) Providing a sanitary design that is geared for the food industry.

PRIOR ART

A novelty search was completed for the feeder bowl and preparation system for packaging stick-like objects or equivalent machine. The search included the following:

A. European Patent EP 2305044 B1 Handling system for transporting, removing, or inserting rod-like elements Wiemer 2009. The invention relates to a handling system for transporting, removing, or inserting rod-like elements from or into a storage frame, the rod-like elements, like smoking rods, serving for storing products, each having a sausage-shaped body and a loop for a pendulously storage of the products. The handling system comprises a robotic device with at least one robotic arm being movably in three dimensions, at least one gripping device for reversibly gripping the rod-like elements, wherein the gripping device is attached to the robotic arm of the robotic device. Moreover, a preventing unit for preventing uncontrolled movement of the products hanging up on the rod-like elements is provided.

B. European Patent EP1985183B1 Smoking stick feed and method for exact feed positioning of a smoking stick Maschinenfabrik 2007. Provided is a guide that has a housing with an upper end on which a smoking bar support is provided. A smoking bar partially lies on the support and is oriented towards a hanger. The support is movable by a drive unit such that the bar is moved out in a longitudinal direction from the guide in a discharge area of a hanger, in which sausages are arranged during discharge. The support is formed as a movable slot, and the drive unit is driven by a motor. The support runs in guide units. An independent claim is also included for a method for precisely supplying a smoking bar.

C. U.S. Pat. No. 4,960,025 APPARATUS FOR SLICING MEAT STICKS Fitch 1990. Taught is an apparatus for slicing sticks of meat and applying the meat slices to a pizza for utilization in mass producing pizza is disclosed. The meat slicing apparatus comprises a ring having an inner cutting surface and a platter in spaced relationship below the ring opening. The meat slicing apparatus 8 provides a motor and a belt for rotating the ring, and a hopper for delivering meat sticks through the ring opening onto the platter surface. The meat slicing apparatus also provides a mechanism for moving the ring and platter relative to the hopper to cause the inner cutting surface of the ring to slice the meat stick.

D. Current equipment on the market—Meat Stick Machine DARIN Manufactured Meat Strip Extruding Line comes on upper belt, and trays comes on nether belt. Whole system is composed by trays storage, trays picking up, trays conveying, auto cutter. https://www-.darin.cn/Pet-Dog-Meat-Strip-Processing-Line-Make-a-machine-working-video-id45967877.html E. Current equipment on the market—Thermovac Multivac Model R240 Watts Meat Machinery. https://wattsmeatmachinery.com/thermoformer-multivac-model-r240-1/

As can be observed, none of the prior art has anticipated or caused one skilled in the feeding and orienting stick like objects to anticipate or to see this invention as obvious to one skilled in the industry. The feeder bowl and preparation system for packaging stick-like objects provides an answer to a compact, versatile, clean, and fast manner to organized, align, and singularly feed the stick-like objects.

SUMMARY OF THE INVENTION

This invention is a feeder bowl and preparation system for packaging stick-like objects. The main function of this design is to uncouple the product load station from the robotic pick station. The most unique portion of the system is in the collator or custom index after the feeder bowl orients and the vee conveyor spaces the stick-like objects. The collator functions by six belts that are driven in pairs by 3 servo motors. For example, the SERVO MOTOR 1 DRIVES BELTS 1 & 4, SERVO MOTOR 2 DRIVES BELTS 2 & 5, SERVO MOTOR 3 DRIVES BELTS 3 & 6. These belts move the CARRIAGES (or nest groups) from zone to zone. The CARRIAGES or nest groups ACT LIKE TRAIN CARTS IN THAT THEY CAN NOT PASS ONE ANOTHER, BUT CAN BE STACK UP BEHIND ONE ANOTHER. Each of the CARRIAGES or nest groups CAN HAVE A CUSTOMIZABLE NUMBER OF SLOTS WITH VARYING WIDTHS AND LENGTHS ALLOWING FOR COMPLETE CUSTOMIZATION to the various stick-like objects.

The preferred embodiment of a feeder bowl and preparation system for packaging stick-like objects, the system 30 is comprised of: a) a centrifugal feeder bowl 40 with a tooling ring 41, a set of diverters, qualifiers, sensors and solenoids 42 to orient and control the objects 100 during orientation, a transfer conveyor 43, and a Shibuya Hoppmann or equal centrifugal feeder 91 base with features 92; b) a custom "Vee" conveyor 50 with a single drive 51 for both belts 52, a set of removable belts 52 and pulleys 52A for cleaning and washdown, a drive motor and gear reducer 53, a structure 58; c) a custom stick indexer 60 or collator section with a nest group/area 61—each of the three (3) nest groups 61 travel independent of one another, an empty nest 61A traveling to a loading area 63, a guide funnel 62, the loading area 63, an unload area 64—automated pick area such as robotic or automatic unload system or device 70 such as pick and place, etc., a set of servo motors 66 (one of three), each servo drive 66 controls 2 of the 6 belts 67, a multi-servo conveyor 67A or set of belts, and a structure 68 of the custom stick indexer 60; and d) a control and power electrical panels 90 with electrical power feed and switches for power in to drive motors of centrifugal feeder 91.

OBJECTS AND ADVANTAGES

There are several objects and advantages of the feeder bowl and preparation system for packaging stick-like objects shown in the following Table A:

| Item | Advantages |
|---|---|
| 1 | Robotic pickers no longer require vision guidance. |
| 2 | Robotic pickers are no longer waiting and analyzing if there is a product and if they are clear to grab the product because the collator preloads and presents products for easy exchange and integration. |
| 3 | Robotic industries can grab an entire carriage at a time allowing for easier packaging applications. (No more individual loading products for packaging). |
| 4 | Carriages can house any number of products for presentation allowing for design customization that will tailor-fit the packaging application. |
| 5 | Carriages are also interchangeable allowing for multiple products to be used in the system. |
| 6 | The entire system is to food grade spec. |
| 7 | The product tooling change-over reduces changeover time. |
| 8 | A compact footprint reduces floor space requirements. |
| 9 | Simple changeover to other product reduces initial capital investments, spare parts inventory, and maintenance (training and understanding of equipment). |

Finally, other advantages and additional features of the present feeder bowl and preparation system for packaging stick-like objects will be more apparent from the accompanying drawings and from the full description of the device. For one skilled in the art of feeder machines and orientation equipment for various configured parts, it is readily understood that the features shown in the examples with this Feeder Bowl and Preparation System are readily adapted to other types of processing for stick-like objects orientation equipment and tools.

DESCRIPTION OF THE DRAWINGS—FIGURES

The accompanying drawings, which are incorporated in and constitute a part of this specification, illustrate an embodiment of the feeder bowl and preparation system for packaging stick-like objects. The drawings together with the summary description given above and a detailed description given below explain the principles of the feeder bowl and preparation system. It is understood, however, that the feeding device and system is not limited to only the precise arrangements and instrumentalities shown.

FIGS. 6A through 6E are sketches of prior art for stick-like object feeders and orientation machines.

DESCRIPTION OF THE DRAWINGS—REFERENCE NUMERALS

Figure 1:
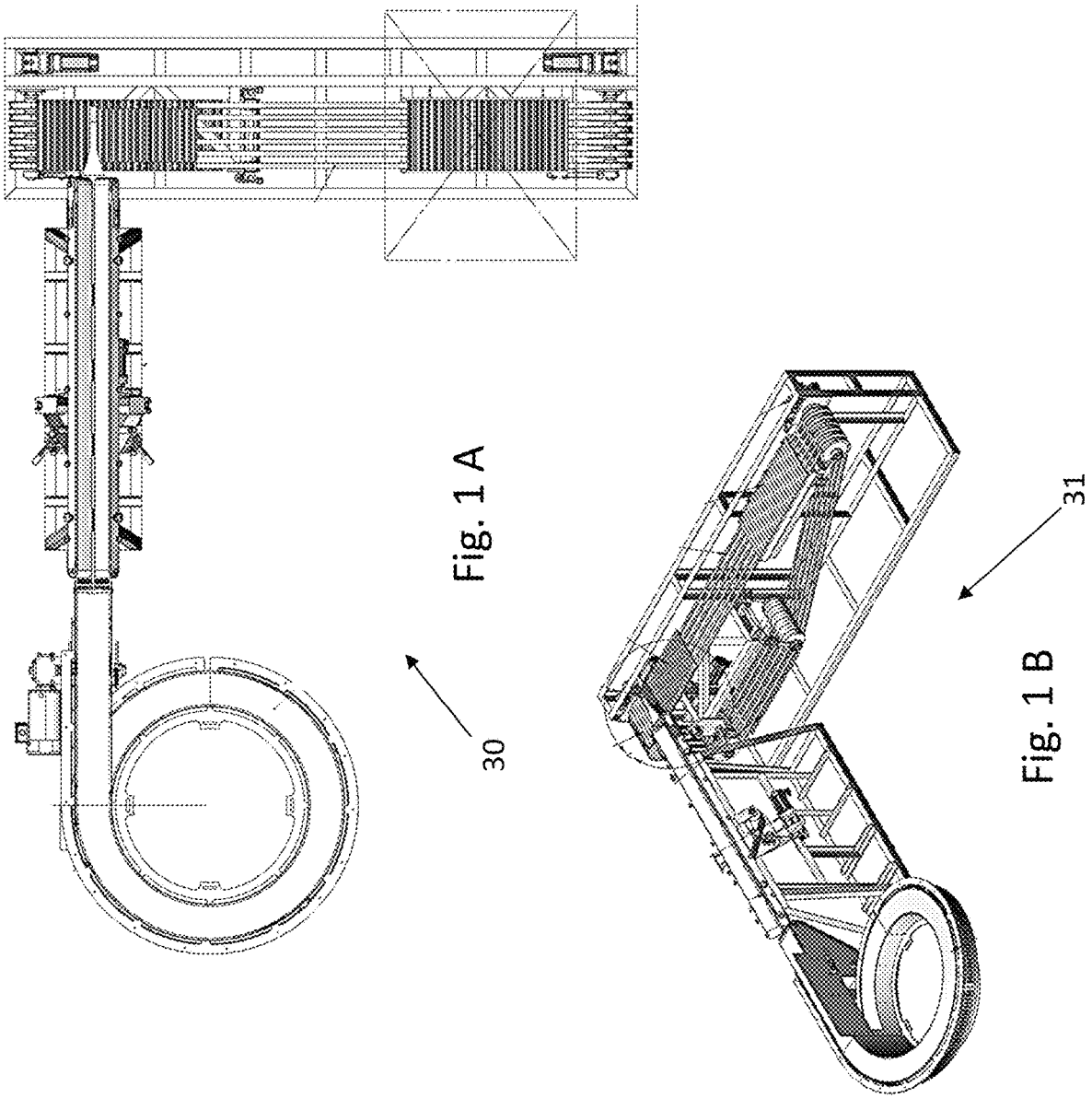
FIGS. 1A and 1B are top view and isometric sketches of the general feeder bowl and preparation system for packaging stick-like objects.

The following list refers to the drawings:

TABLE B

| Reference numbers | |
|---|---|
| Ref # | Description |
| 30 | A feeder bowl and preparation system 30 for Packaging Stick-like Objects 100 |
| 31 | an isometric view 31 of a feeder bowl and preparation system 30 for packaging stick-like objects 100 |
| 40 | centrifugal feeder bowl 40 |
| 41 | tooling ring 41 |
| 42 | diverters, qualifiers, sensors, and solenoids 42 to orient and control the objects 100 during orientation to Vee conveyor 50 |
| 43 | transfer conveyor 43 object 100 from centrifugal bowl 40 to vee conveyor 50 |
| 50 | custom "Vee" conveyor 50 |
| 51 | single drive 51 for both belts 52 |
| 52 | removable belts 52 and pulleys 52A for cleaning and washdown |
| 53 | drive motor and gear reducer 53 for vee conveyor 50 |
| 58 | structure 58 of the vee conveyor 50 (angles, tee, channel, beams, tubing of metal (steel, stainless, plastics/HDPE, composite material etc.) |
| 60 | custom stick indexer 60 or collator |
| 61 | nest group/ area 61 - each of the three (3) nest groups 61 travel independent of one another |
| 61A | empty nest 61A traveling to loading area 63 |
| 62 | guide funnel 62 |
| 63 | loading area 63 |
| 64 | unload area 64 - automated pick area such as robotic or automatic unload system or device 70 such as pick and place, etc. |
| 65 | staging area 65 |
| 66 | servo motors 66 (one of three) |
| 67 | each servo drive 66 controls two (2) of the six (6) belts 67 |
| 67A | multi-servo conveyor 67A |
| 68 | structure 68 of the custom stick indexer 60 (angles, tee, channel, beams, tubing of metal (steel, stainless, plastics/HDPE, composite material etc.) |
| 70 | automatic unload system or device 70 such as robot, pick and place, shuttle, etc. |
| 90 | control and power electrical panels 90 with electrical power feed and switches for power in to drive motors of centrifugal feeder 91 |
| 91 | Shibuya Hoppmann or equal centrifugal feeder 91 |

TABLE B-continued

| Reference numbers | |
|---|---|
| Ref # | Description |
| 92 | features 92 of centrifugal feeder 91 |
| 100 | object/product/part - stick-like Objects 100 such as but not limited to meat sticks, candles, dowel rods, bulk food sticks, bulk soap sticks, wax, and the like |
| 300 | prior art 300 - EP 2 305 044 B1 Handling system for transporting, removing, or inserting rod-like elements Wiemer 2009 |
| 310 | prior art 310 - EP1985183B1 Smoking stick feed and method for exact feed positioning of a smoking stick Maschinenfabrik 2007 |
| 320 | prior art 320 - U.S. Pat. No. 4,960,025 APPARATUS FOR SLCNG MEAT STICKS Fitch 1990 |
| 330 | prior art 330 - Meat Stick Machine DARIN Manufactured Meat Strip Extruding Line comes on upper belt, and trays comes on nether belt. Whole system is composed by trays storage, trays picking up, trays conveying, auto cutter |
| 340 | prior art 340 - Thermovac Multivac Model R240 Watts Meat Machinery |

DETAILED DESCRIPTION OF PREFERRED EMBODIMENT

This invention relates to a feeder bowl and preparation system for packaging stick-like objects. Particularly it relates to a feeder bowl, "vee" shaped spacing conveyor, and collator system to permit a station such as a robotic pick station sufficient time to pick and place a stick-like object/product. The present disclosure relates generally to the preparation, orientation and handling stick-like objects by a system that automates the process. The present invention relates to a clean product aligning, separating and staging device made of food grade and cleanable grade materials that are easily disassembled and able to be washed in hot water and steam. It relates to a system that significantly reduces time, labor, and waste while increasing productivity, quality, and machine uptime.

This invention is a feeder bowl and preparation system for packaging stick-like objects that:

A. Robotic pickers no longer require vision guidance.

B. Robotic pickers are no longer waiting and analyzing if there is a product and if they are clear to grab the product because the collator preloads and presents products for easy exchange and integration.

C. Robotic industries can grab an entire carriage at a time allowing for easier packaging applications. (No more individual loading products for packaging).

D. Carriages can house any number of products for presentation allowing for design customization that will tailor-fit the packaging application.

E. Carriages are also interchangeable allowing for multiple products to be used in the system.

F. The entire system is to food grade spec.

G. The product tooling change-over reduces changeover time.

H. A compact footprint reduces floor space requirements.

I. Simple changeover to other product reduces initial capital investments, spare parts inventory, and maintenance (training and understanding of equipment).

The preferred embodiment of a feeder bowl and preparation system for packaging stick-like objects, the system 30 is comprised of: a) a centrifugal feeder bowl 40 with a tooling ring 41, a set of diverters, qualifiers, sensors and solenoids 42 to orient and control the objects 100 during orientation, a transfer conveyor 43, and a Shibuya Hopp-mann or equal centrifugal feeder 91 base with features 92; b) a custom "Vee" conveyor 50 with a single drive 51 for both belts 52, a set of removable belts 52 and pulleys 52A for cleaning and washdown, a drive motor and gear reducer 53, a structure 58; c) a custom stick indexer 60 or collator section with a nest group/area 61—each of the three (3) nest groups 61 travel independent of one another, an empty nest 61A traveling to a loading area 63, a guide funnel 62, the loading area 63, an unload area 64—with automatic unload system or device 70 such as robot, pick and place, shuttle, etc., a set of servo motors 66 (one of three), each servo drive 66 controls two of the six (6) belts 67, a multi-servo conveyor 67A or set of belts, and a structure 68 of the custom stick indexer 60; and d) a control and power elec-trical panels 90 with electrical power feed and switches for power in to drive motors of centrifugal feeder 91.

There is shown in FIGS. 1-6 a complete description and operative embodiment of the feeder bowl and preparation system 30 for packaging stick-like objects 100. In the drawings and illustrations, one notes well that the FIGS. 1-6 demonstrate the general configuration and use of this prod-uct. The various example uses are in the operation and use section, below.

The accompanying drawings, which are incorporated in and constitute a part of this specification, illustrate an embodiment of the feeder bowl and preparation system for packaging stick-like objects that is preferred. The drawings together with the summary description given above and a detailed description given below explain the principles of the feeder bowl and preparation system 30. It is understood, however, that the device and system 30 is not limited to only the precise arrangements and instrumentalities shown. Other examples of stick-like object orienting machines and sys-tems for versatile use with many other stick-like objects are still understood by one skilled in the art of feeding equip-ment and devices to be within the scope and spirit shown here.

FIGS. 1A and 1B are top view and isometric sketches of the general feeder bowl and preparation system for packag-ing stick-like objects 30. Shown in these introductory draw-ings are a feeder bowl and preparation system 100 for packaging stick-like objects 100 and an isometric view 31 of a Feeder Bowl and Preparation System 30 for Packaging Stick-like Objects 100.

Figure 2:
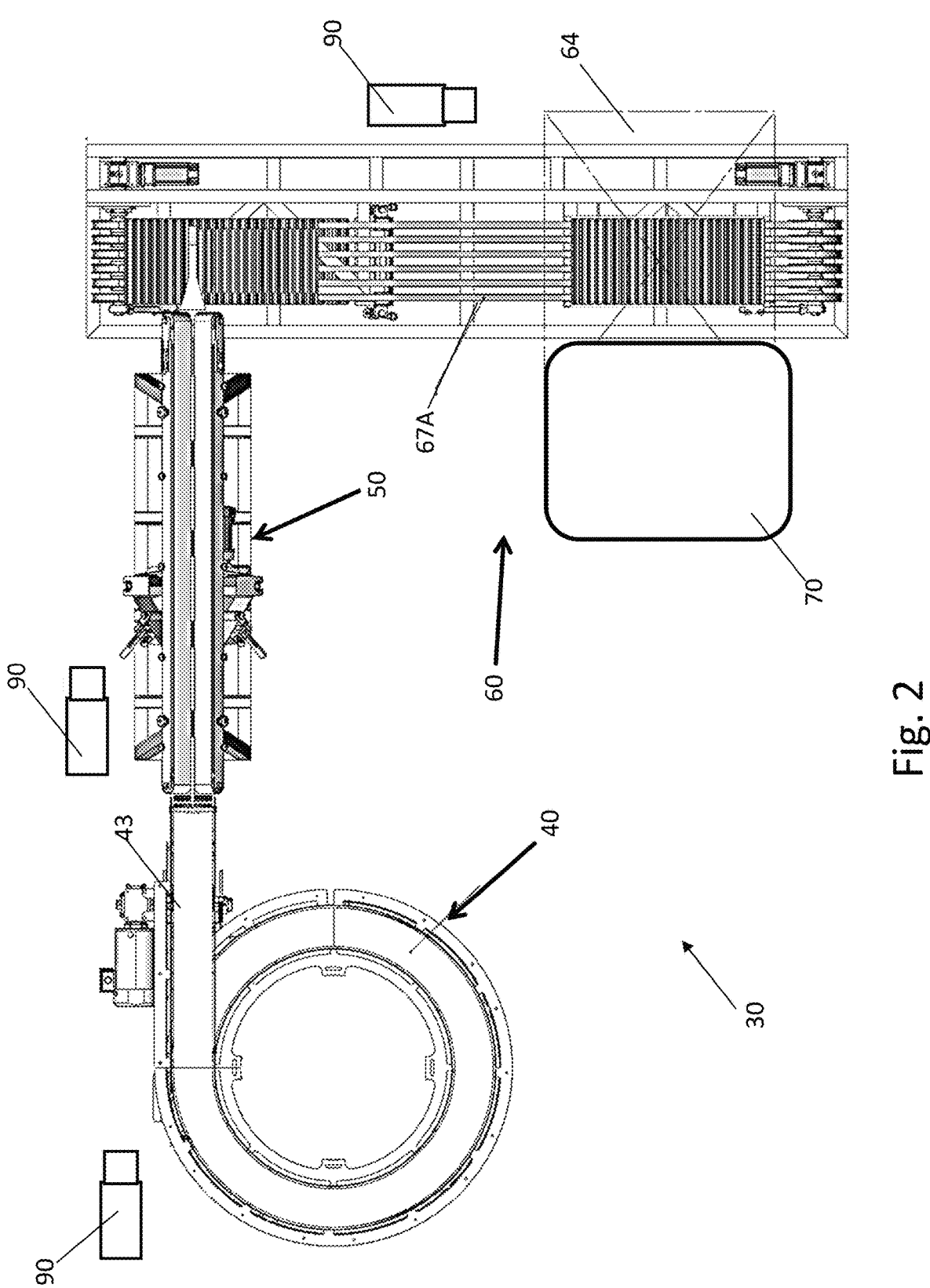
FIG. 2 is a top view of the feeder bowl and preparation system for packaging stick-like objects with components and features noted.
Figure 3:
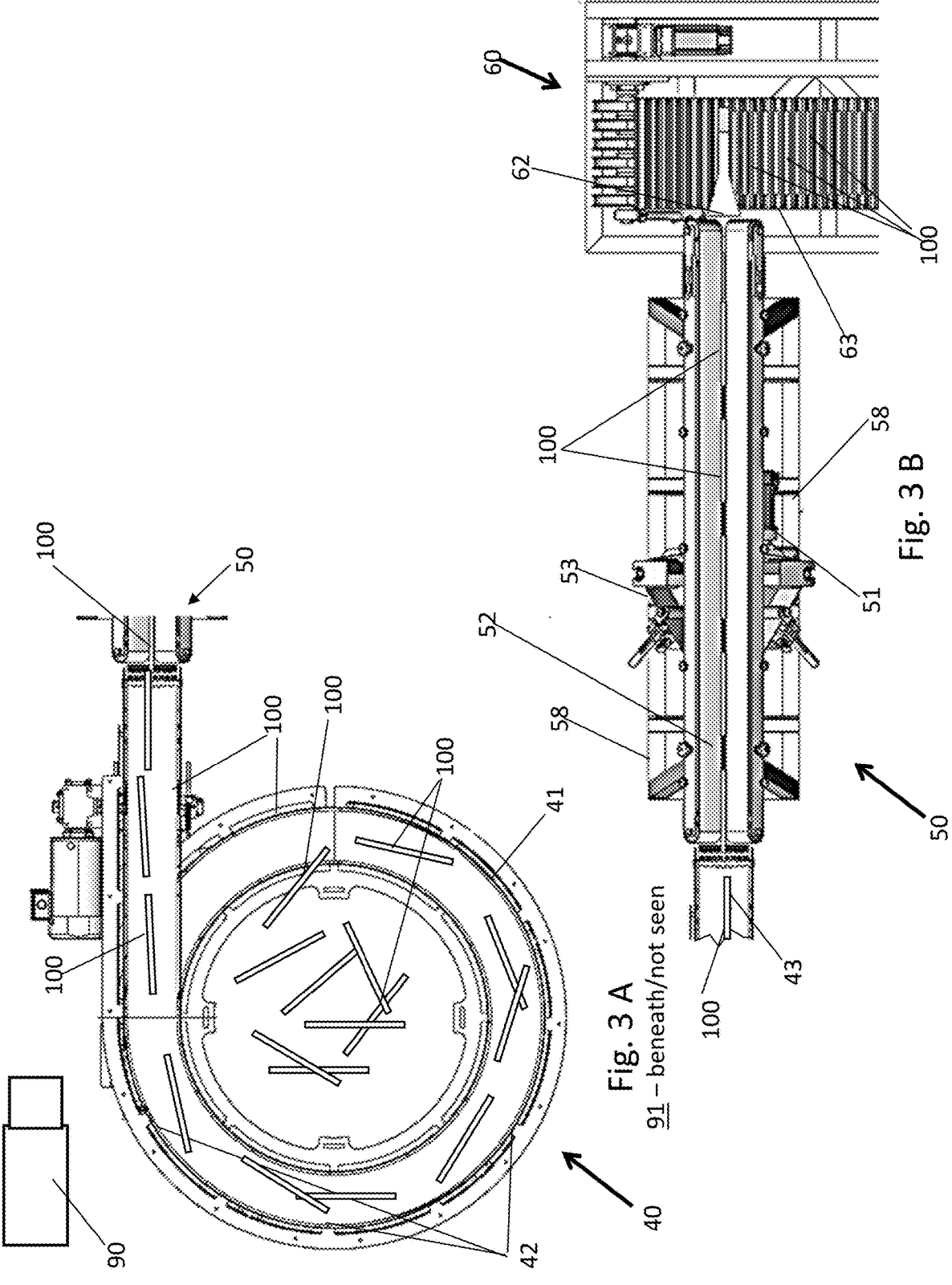
FIGS. 3A and 3B are sketches of the top view of the centrifugal bowl feeder for stick-like objects and the vee conveyor for stick-like objects with components and features noted.
Figure 4:
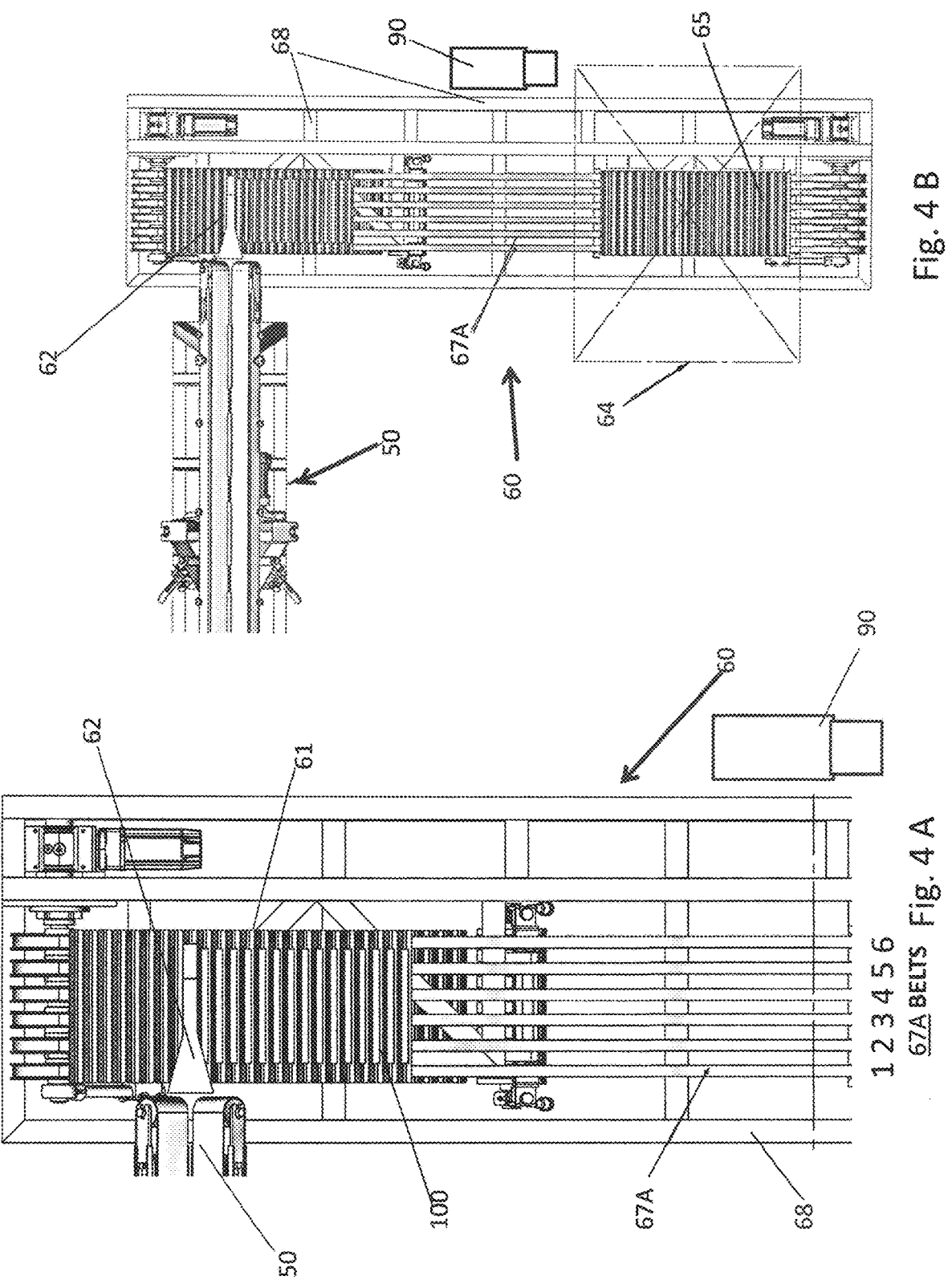
FIGS. 4A through 4D are sketches of the isometric view of the feeder bowl and preparation system for packaging stick-like objects, details of the custom stick collator and indexer and further details of the transfer from the vee conveyor to the custom stick collator and indexer with components and features noted.
Figure 4:
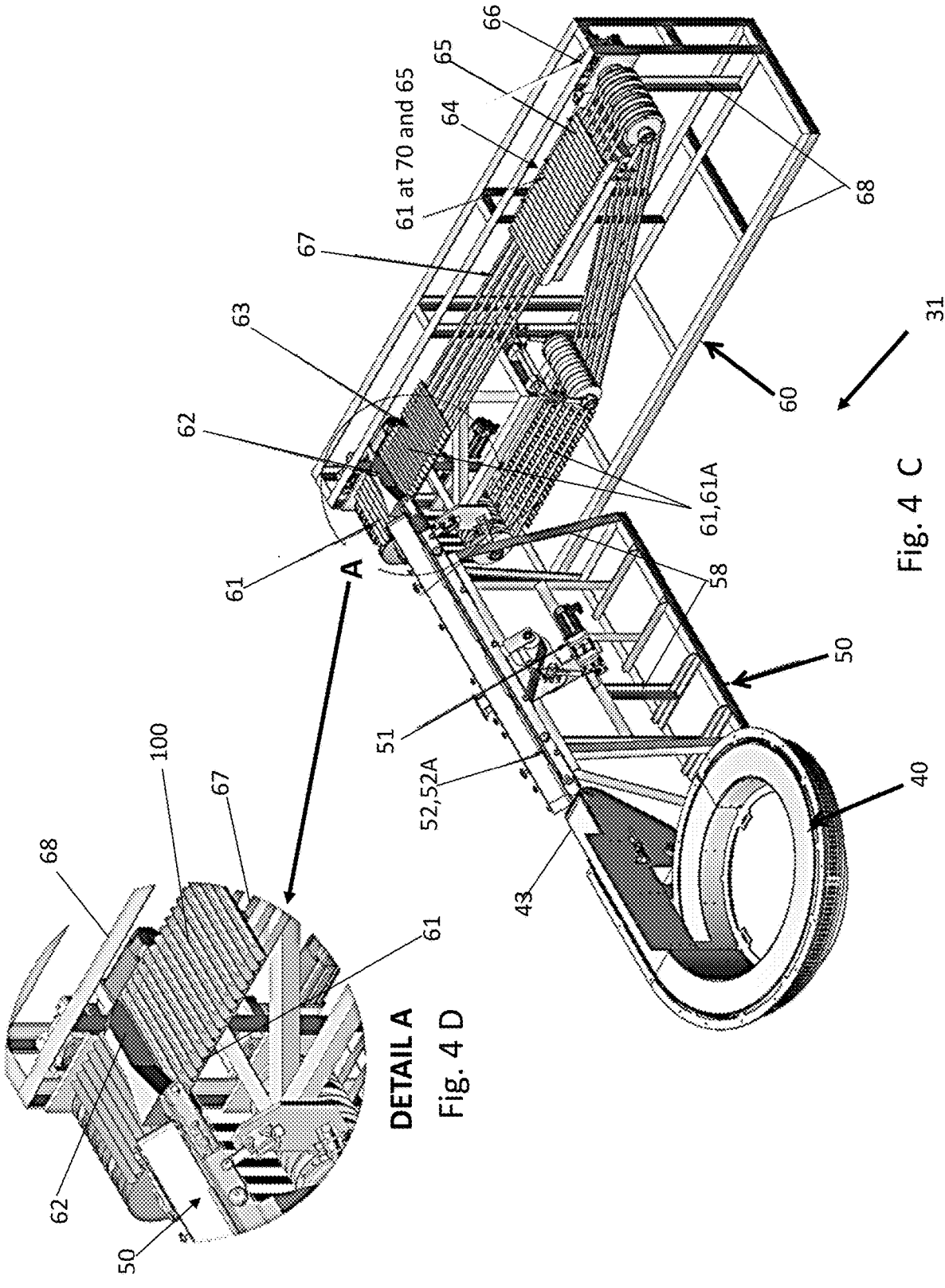
Figure 5:
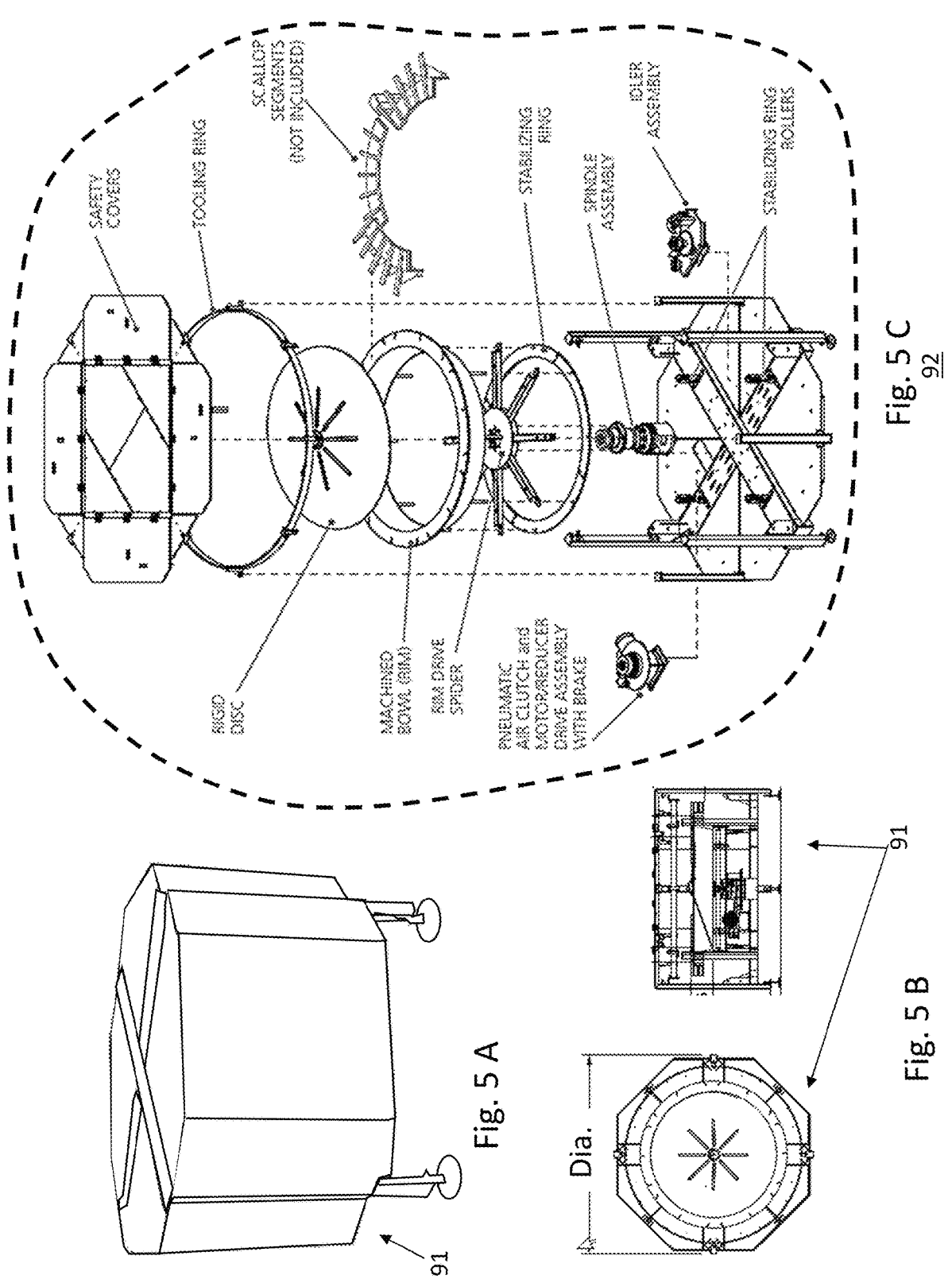
FIGS. 5A through 5C are sketches of the purchased base centrifugal bowl feeder with features and components noted.

FIG. 2 is a top view of the feeder bowl 40 and vee conveyor 50 of the feeder bowl and collator System 60 for packaging stick-like objects 100 with components and fea-tures noted. Demonstrated in this drawing are: a feeder bowl and preparation system 30 for packaging stick-like objects 100; a centrifugal feeder bowl 40; a transfer conveyor 43 object 100 from centrifugal bowl 40 to vee conveyor 50; a custom "Vee" conveyor 50; a custom stick indexer 60 or collator section; an unload area 64—automated pick area with automatic unload system or device 70 such as robot, pick and place, shuttle, etc.; a multi-servo conveyor 67A; a robotic or automatic unload system or device 70 such as pick and place, etc.; and several control and power electrical panels 90 with electrical power feed and switches for power in to drive motors of centrifugal feeder 91.

FIGS. 3A and 3B are sketches of the top view of the centrifugal bowl feeder 40 for stick-like objects 100 and the vee conveyor 50 for stick-like objects with components and features noted. Portrayed and shown here are: a centrifugal feeder bowl 40; a tooling ring 41; a set of diverters, qualifiers, sensors and solenoids 42 to orient and control the objects 100 during orientation to Vee conveyor 50; a transfer conveyor 43 object 100 from centrifugal bowl 40 to vee conveyor 50; a custom "Vee" conveyor 50; a single drive 51 for both belts 52; a set of removable belts 52 and pulleys 52A for cleaning and washdown; a drive motor and gear reducer 53 for vee conveyor 50; a structure 58 of the Vee conveyor 50 (angles, tee, channel, beams, tubing of metal (steel, stainless, plastics/HDPE, composite material etc.); a custom stick indexer 60 or collator section; a guide funnel 62; a loading area 63; a Shibuya Hoppmann or equal centrifugal feeder 91; and a stick-like Objects 100 such as but not limited to meat sticks, candles, dowel rods, bulk food sticks, bulk soap sticks, wax, and the like.

FIGS. 4A through 4D are sketches of the isometric view 31 of the feeder bowl and preparation system 30 for pack-aging stick-like objects 100, details of the custom stick collator and indexer 60 and further details of the transfer from the vee conveyor 50 to the custom stick collator and indexer 60 with components and features noted. Presented in these views are: a centrifugal feeder bowl 40; a transfer conveyor 43 object 100 from centrifugal bowl 40 to vee conveyor 50; a custom "Vee" conveyor 50; a single drive 51 for both belts 52; a set of removable belts 52 and pulleys 52A for cleaning and washdown; a drive motor and gear reducer 53 for vee conveyor 50; a structure 58 of the Vee conveyor 50 (angles, tee, channel, beams, tubing of metal (steel, stainless, plastics/HDPE, composite material etc.); a custom stick indexer 60 or collator section; a nest group/area 61—each of the three (3) nest groups 61 travel independent of one another; an empty nest 61A traveling to loading area 63; a guide funnel 62; a loading area 63; an unload area 64—automated pick area such as robotic or automatic unload system or device 70 such as pick and place, etc.; a staging area 65, a set of servo motors 66 (one of three); each servo drive 66 controls two of the six (6) belts 67; a multi-servo conveyor 67A; a structure 68 of the custom stick indexer 60 (angles, tee, channel, beams, tubing of metal (steel, stainless, plastics/HDPE, composite material etc.); a control and power electrical panels 90 with electrical power feed and switches for power in to drive motors of centrifugal feeder; and a stick-like Objects 100 such as but not limited to meat sticks, candles, dowel rods, bulk food sticks, bulk soap sticks, wax, and the like.

FIGS. 5A through 5C are sketches of the purchased base centrifugal bowl feeder 91 (Shibuya Hoppmann or equal—for example and not limitation) with features and compo-nents noted. Demonstrated are a Shibuya Hoppmann or equal centrifugal feeder 91 and a group of features 92 of centrifugal feeder 91. The group of features 92 comprise a set of stabilizing ring rollers, an idler assembly, a spindle assembly, a pneumatic air clutch and motor reducer, stabi-lizing ring, a rim drive spider, a machined bowl rim, a rigid disk, a tool ring, and a safety cover.

FIGS. 6A through 6E are sketches of prior art for feeder bowl and preparation system 30 for packaging stick-like objects 100. The Prior Art includes prior art 300—EP 2 305 044 B1 Handling system for transporting, removing or inserting rod-like elements Wiemer 2009; prior art 310—EP1985183B1 Smoking stick feed and method for exact feed positioning of a smoking stick Maschinenfabrik 2007; prior art 320—U.S. Pat. No. 4,960,025 APPARATUS FOR SLCNG MEAT STICKS Fitch 1990; prior art 330—Meat Stick Machine DARIN Manufactured Meat Strip Extruding Line comes on upper belt, and trays comes on nether belt.

Entire system is composed by trays storage, trays picking up, trays conveying, auto cutter; and prior art 340—Thermovac Multivac Model R240 Watts Meat Machinery. As can be seen, the novel Feeder Bowl and Preparation System 30 for Packaging Stick-like Objects 100 as compared to prior art is a unique combination and use as described herein.

The anticipated materials for the feeder bowl and preparation system 30 for packaging stick-like objects 100 include: for components which have contact with the objects/products and parts 100 which are the "part contact surfaces"—an ABS Plastic Disc, high temperature Delrin® plastic, a 304 Stainless Steel Tooling ring, an FDA approved Acetal belt material or equal for each conveyor, a 304 Stainless Steel Reorientation Cam, a 304 Stainless Steel Height Qualifier, Frame Construction—a 304 Stainless Steel Tubing with wash features for cleanability. All are washable with hot water and commercial/industrial soaps for preparation, and all can resist extreme hot water and steam sprays for quasi sterilization. Sizes and construction details anticipated are wash down motor/gearbox w/ common part numbers; all bearings to be sealed and greasable with Zerk fittings and pointing outwardly for access; and a drive pulley to be of a griptwist material or equal. As durable and composite materials are developed, it is anticipated they can replace some of the Stainless-Steel components.

The details mentioned here are exemplary and not limiting. Other specific components and manners specific to describing a feeder bowl and preparation system 30 for packaging stick-like objects 100 can be added as a person having ordinary skill in the field of the art of feeding systems and equipment for stick like objects and for various products and objects including foodstuff.

OPERATION OF THE PREFERRED EMBODIMENT

The feeder bowl and preparation system 30 for packaging stick-like objects 100 has been described in the above embodiment. The manner of how the device operates is described below. One notes well that the description above and the operation described here must be taken together to fully illustrate the concept of the new Feeder Bowl and Preparation System 30.

The preferred embodiment of a feeder bowl and preparation system for packaging stick-like objects, the system 30 is comprised of: a) a centrifugal feeder bowl 40 with a tooling ring 41, a set of diverters, qualifiers, sensors and solenoids 42 to orient and control the objects 100 during orientation, a transfer conveyor 43, and a Shibuya Hoppmann or equal centrifugal feeder 91 base with features 92;

b) a custom "Vee" conveyor 50 with a single drive 51 for both belts 52, a set of removable belts 52 and pulleys 52A for cleaning and washdown, a drive motor and gear reducer 53, a structure 58; c) a custom stick indexer 60 or collator section with a nest group/area 61—each of the three (3) nest groups 61 travel independent of one another, an empty nest 61A traveling to a loading area 63, a guide funnel 62, the loading area 63, an unload area 64—automated pick area such as robotic or automatic unload system or device 70 such as pick and place, etc., a set of servo motors 66 (one of three), each servo drive 66 controls 2 of the 6 belts 67, a multi-servo conveyor 67A or set of belts, and a structure 68 of the custom stick indexer 60; and d) a control and power electrical panels 90 with electrical power feed and switches for power in to drive motors of centrifugal feeder 91.

An overview of theory of operation for the feeder bowl and preparation system 30 for packaging stick-like objects 100 is as follows: The main function of this design is to uncouple the product load station from the robotic pick station which will result in:

a) Simplifying the robotic picker programming by presenting a desire amount of product for a specific picker and allowing it sufficient time to pick and place product.

b) Eliminates feeds rate being dictated by the robotic picker.

c) Allows for higher rates overall due to easy pick-up area presentation and by allowing the feeder to run at optimal rates.

d) Eliminates sensory overload on robotic picker.

e) Sanitary design that is geared for the food industry.

The most unique portion of the system is in the collator or custom index after the feeder bowl orients and the vee conveyor spaces the stick-like objects. See FIG. 4C. The collator functions by six belts that are driven in pairs by 3 servo motors. For example, the SERVO MOTOR 1 DRIVES BELTS 1 & 4, SERVO MOTOR 2 DRIVES BELTS 2 & 5, SERVO MOTOR 3 DRIVES BELTS 3 & 6. These belts move the CARRIAGES (or nest groups) from zone to zone. The CARRIAGES or nest groups ACT LIKE TRAIN CARTS IN THAT THEY CAN NOT PASS ONE ANOTHER, BUT CAN BE STACK UP BEHIND ONE ANOTHER. Each of the CARRIAGES or nest groups CAN HAVE A CUSTOMIZABLE NUMBER OF SLOTS WITH VARYING WIDTHS AND LENGTHS ALLOWING FOR COMPLETE CUSTOMIZATION to the various stick-like objects.

In FIG. 2 and FIG. 4C shows how the feeder bowl 40 operates. With the base of the Shibuya Hoppmann or equal centrifugal feeder 91 and features 92, the centrifugal feeder bowl 40 accompanied by the tooling ring 41 and diverters, qualifiers, sensors, and solenoids 42 to orient and control the objects 100 during orientation to Vee conveyor 50 orient the stick-like objects 100 and feed them to the transfer conveyor 43 and on to the vee conveyor 50. The main function of the feeder bowl 40 are:

a) singulates an object/product/part 100 b) orients the object/product/part 100 in a length wise/longitudinal position c) conveys the object/product at a high rate of output, and d) delivers the object/product to a vee conveyor;

Note: Singulation is the act or process of separating conjoined or tightly mixed units or object/product/parts 100 into individual parts or pieces. Typically used in manufacturing to describe the act or process of separating parts/objects into individual units from larger conjoined batches or production runs.

Next, the Vee conveyor 50 as shown in FIG. 2, FIGS. 3B and 4C functions as/to:

a) Vee conveyor 50 constantly runs and does not shut off during operation;

b) Vee conveyor 50 feeds objects/product/parts 100 to a guide funnel 62 and on to a slot on a carriage 61;

c) Meanwhile, a set of conveyor belts 67 are running at a faster transfer rate than Vee conveyor 50 which creates a space or distance between the individual objects/parts/products 100 which enables and facilitates loading (i.e., makes the loading of objects 100 easier); and d) Accepts objects/parts/products 100 from the feeder bowl 40.

The collator/indexer 60 functions as shown in FIG. 2, and FIG. 4A through 4D:

a) A set of three (3) servos of the collator/indexer 60 moves carriages 61 from a loading area 63 to an unload area 64 then to an automated pick-up device 70 prior to a staging area 65;

b) The loading area 63 functions by placing object/product/parts 100 into one of a set of slots on the carriage 61 and then moves forward. If a slot is empty, the carriage 61 does not move and progress forward;

c) If the slot is already full, the only the loading area 63 carriage 61 moves forward to present the next slot until all the slots are full of object/product/parts. Once all the slots are full, the carriage heads/progresses/moves to automated pick-up device or system 70;

d) Once the carriage 61 is at the unload area 65, the carriage stays until the automatic unload system or device 70 such as robot, pick and place, shuttle, etc. completes a full cycle and then the carriage 61 heads/progresses/moves to the staging area 65 of the collator 31; and e) Once at the staging area 65, a group of the individual carriages 61 are prepared by stacking each of the individual carriages in the loading area to a pre-determined height. Once the pre-determined height of carriages is achieved, the loading area is determined to be "full" and it moves to behind the last slot which creates a gap between the two sets of carriages.

Many different uses are anticipated for the Feeder Bowl and Preparation System 30 for Packaging Stick-like Objects. Some examples, and not limitations, for use include and are shown in the following Table C.

| ITEM | STICK-LIKE OBJECTS |
| --- | --- |
| 1 | meat sticks |
| 2 | Candles |
| 3 | dowel rods |
| 4 | bulk food sticks |
| 5 | bulk soap sticks |
| 6 | Wax sticks |
| 7 | threaded pipe and electrical conduit |
| 8 | specialty wood-like balsa sticks |
| 9 | bulk wood stakes for surveyors and builders |
| 10 | long pet chew sticks |
| 11 | Pneumatic and hydraulic cylinders |
| 12 | metal and plastic rods |

With this description it is to be understood that the Feeder Bowl and Preparation System 30 for Packaging Stick-like Objects 100 is not to be limited to only the disclosed embodiment of product. The features of the present invention 30 are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. Various features and aspects of the disclosed embodiments can be combined with or substituted for one another to form varying modes of the disclosed inventions. Thus, it is intended that the scope of at least some of the present inventions herein disclosed should not be limited by the disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any embodiment, feature, or combination of features shown herein. This is true even if only a single embodiment of the feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed considering the number of recited significant digits and by applying ordinary rounding techniques.

The present invention contemplates modifications as would occur to those skilled in the art. While the disclosure has been illustrated and described in detail in the figures and the foregoing description, the same is to be considered as illustrative and not restrictive in character, it being understood that only selected embodiments have been shown and described and that all changes, modifications, and equivalents that come within the spirit of the disclosures described heretofore and or/defined by the following claims are desired to be protected.

What is claimed is:

1. A feeder bowl and preparation system (30) for packaging stick-like object (100), the system (30) having a set of components comprised of:

a) a centrifugal feeder bowl (40) with a tooling ring (41) having features which orient the objects and control the objects during orientation and having a centrifugal feeder base (91);

(b) a transfer conveyor (43) which moves the objects from the feeder bowl to a custom "Vee" conveyor (50) which transfers the objects to a custom stick indexer/collator (60) wherein the custom "Vee" conveyor (50) comprises a single drive (51) for both belts (52), a set of removable belts (52) and pulleys (52A) for cleaning and washdown, a drive motor and gear reducer (53), and a structure (58);

c) the custom stick indexer/collator (60) with a structure (68); and d) control and power electrical panels (90) with electrical power feed and switches for providing electrical power in to drive motors of the centrifugal feeder (91)

d) control and power electrical panels (90) with electrical power feed and switches for providing electrical power in to drive motors of the centrifugal feeder (91)

wherein the components of the system have surfaces which have contact with the stick-like object (100) and which are made of cleanable materials; wherein the system orients and feeds stick-like objects to a packaging system; and wherein the system simplifies programming a transfer of the objects by presenting a desired amount of product for a specific picker and allowing time to pick and place the object, eliminates a feed rate by a robotic process in the system, allows for essentially higher feed rate overall due to an oriented pick-up area presentation and provides a sanitary design compatible with a transfer of food products in a food industry.

2. The feeder bowl and preparation system (30) for packaging stick-like object (100) of claim 1 wherein the structure (58) of the "Vee" conveyor (50) is selected from the group consisting of angles, tees, channels, beams, metal tubing, steel tubing, stainless steel tubing, plastic tubing and tubing made of a composite material.

3. The feeder bowl and preparation system (30) for packaging stick-like object (100) of claim 1 wherein the structure (68) of the custom stick indexer/collator (60) is selected from the group consisting of angles, tees, channels, beams, metal tubing, steel tubing, stainless steel tubing, plastic tubing and tubing made of a composite material.

4. The feeder bowl and preparation system (30) for packaging stick-like object (100) of claim 1 wherein the custom stick indexer/collator (60) comprises (1) a section with a set of three nest groups (61), wherein each of the three (3) nest groups (61) travel independent of one another, (2) an empty nest (61A) traveling to a loading area (63), (3) a guide funnel (62), (4) the loading area (63), (5) an unloading area (64) with an automatic pick system (70), (5) a set of servo motors (66), and (6) a set of controls for two of a set of up to six (6) belts (67) and a multi-servo conveyor (67A).

5. The feeder bowl and preparation system (30) for packaging stick-like object (100) of claim 1 wherein the cleanable materials on part contact surfaces are selected from the group consisting of a resistance to extreme hot water for quasi sterilization, a resistance to steam sprays for quasi sterilization, and a compatibility to commercial/industrial soaps for preparation.

6. The feeder bowl and preparation system (30) for packaging stick-like object (100) of claim 1 wherein the cleanable materials on part contact surfaces are selected from the group consisting Acrylonitrile butadiene styrene (ABS) Plastic Disc, high temperature plastic, a 304 Stainless Steel, and an acetal belt material which is approved by the Food and Drug Administration for food contact.

7. The feeder bowl and preparation system (30) for packaging stick-like object (100) of claim 1 wherein the stick-like object (100) is selected from the group consisting of meat sticks, candles, dowel rods, bulk food sticks, bulk soap sticks, wax sticks, threaded pipe and electrical conduit, specialty wood-like balsa sticks, bulk wood stakes for surveyors and builders, long pet chew sticks, pneumatic and hydraulic cylinders, metal rods, and plastic rods.

8. A feeder bowl and preparation system (30) for packaging stick-like object (100), the system (30) having a set of components comprised of:

a) a centrifugal feeder bowl (40) consisting of a tooling ring (41) having a set of features including a set of diverters, a set of qualifiers, at least one sensor, and at least one solenoid, the set features functioning to orient the objects and control the objects during orientation and consisting of a feeder base (91);

(b) a transfer conveyor (43) which moves the objects from the feeder bowl to a custom "Vee" conveyor (50) which then transfers the objects to a custom stick indexer/collator (60), the "Vee" conveyor (50) being comprised of a single drive (51) for both belts (52), a set of removable belts (52) and pulleys (52A) for cleaning and washdown, a drive motor and gear reducer (53), and a structure (58);

c) the custom stick indexer/collator (60) comprised of:

(1) a section with a set of three nest groups (61), wherein each of the three (3) nest groups (61) travel independent of one another, (2) an empty nest (61A) traveling to a loading area (63), (3) a guide funnel (62), (4) the loading area (63), (5) an unloading area (64) with an automatic pick system (70), (5) a set of servo motors (66), (6) a set of controls for two of a set of up to six (6) belts (67) and a multi-servo conveyor (67A), and (7) a structure (68); and, d) control and power electrical panels (90) with electrical power feed and switches for providing power in to drive motors of the centrifugal feeder (91) wherein the components of the system have surfaces which have contact with the stick-like object (100) and wherein the system orients and feeds stick-like objects to a packaging system; and wherein the system simplifies programming a transfer of the objects by presenting a desired amount of product for a specific picker and allowing time to pick and place the object, eliminates a feed rate by a robotic process in the system, allows for essentially higher feed rate overall due to an oriented pick-up area presentation and provides a sanitary design compatible with a transfer of food products in a food industry.

9. The feeder bowl and preparation system (30) for packaging stick-like object (100) of claim 8 wherein the structure (58) of the "Vee" conveyor (50) is selected from the group consisting of angles, tees, channels, beams, metal tubing, steel tubing, stainless steel tubing, plastic tubing and tubing made of a composite material.

10. The feeder bowl and preparation system (30) for packaging stick-like object (100) of claim 8 wherein the structure (68) of the custom stick indexer/collator (60) is selected from the group consisting of angles, tees, channels, beams, metal tubing, steel tubing, stainless steel tubing, plastic tubing and tubing made of a composite material.

11. The feeder bowl and preparation system (30) for packaging stick-like object (100) of claim 8 wherein a group of cleanable materials on part contact surfaces are selected from the group consisting of a resistance to extreme hot water for quasi sterilization, a resistance to steam sprays for quasi sterilization, and a compatibility to commercial/industrial soaps for preparation.

12. The feeder bowl and preparation system (30) for packaging stick-like object (100) of claim 8 wherein a group of cleanable materials on part contact surfaces are selected from the group consisting Acrylonitrile butadiene styrene (ABS) Plastic Disc, high temperature plastic, a 304 Stainless Steel, and an acetal belt material which is approved by the Food and Drug Administration for food contact.

13. The feeder bowl and preparation system (30) for packaging stick-like object (100) of claim 8 wherein the stick-like object (100) is selected from the group consisting of meat sticks, candles, dowel rods, bulk food sticks, bulk soap sticks, wax sticks, threaded pipe and electrical conduit, specialty wood-like balsa sticks, bulk wood stakes for surveyors and builders, long pet chew sticks, pneumatic and hydraulic cylinders, metal rods, and plastic rods.

\* \* \* \* \*